US007924459B2

(12) United States Patent
Uji et al.

(10) Patent No.: US 7,924,459 B2
(45) Date of Patent: Apr. 12, 2011

(54) DATA PROCESSING APPARATUS AND METHOD OF EXPANDING DOT ARRANGEMENT PATTERNS

(75) Inventors: Ayako Uji, Kawasaki (JP); Yoshitomo Marumoto, Yokohama (JP); Daigoro Kanematsu, Yokohama (JP); Yoshinori Nakajima, Yokohama (JP); Eiji Komamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 11/695,298

(22) Filed: Apr. 2, 2007

(65) Prior Publication Data
US 2007/0236714 A1    Oct. 11, 2007

(30) Foreign Application Priority Data

Apr. 11, 2006  (JP) .................................. 2006-108908

(51) Int. Cl.
*G06F 15/00* (2006.01)
(52) U.S. Cl. ....... 358/1.9; 358/540; 358/3.16; 358/3.23; 358/3.26
(58) Field of Classification Search .................. 358/1.9, 358/540, 3.16, 3.23, 3.26; 399/74
See application file for complete search history.

(56) References Cited

U.S. PATENT DOCUMENTS

| 5,751,310 | A | 5/1998 | Yano et al. ........................ 347/43 |
| 5,887,124 | A | 3/1999 | Iwasaki et al. ................. 395/109 |
| 5,907,666 | A | 5/1999 | Yano et al. ...................... 395/109 |
| 6,137,507 | A | 10/2000 | Inui et al. ......................... 347/43 |
| 6,145,960 | A | 11/2000 | Kanda et al. ..................... 347/41 |
| 6,203,133 | B1 | 3/2001 | Tanaka et al. .................... 347/15 |
| 6,315,391 | B1 | 11/2001 | Kanematsu ....................... 347/43 |
| 6,805,422 | B2 | 10/2004 | Takahashi et al. ............... 347/15 |
| 6,896,348 | B2 | 5/2005 | Takekoshi et al. .............. 347/15 |
| 7,130,083 | B1 | 10/2006 | Konno et al. ................ 358/3.06 |
| 7,270,390 | B2 | 9/2007 | Baba et al. ....................... 347/15 |

(Continued)

FOREIGN PATENT DOCUMENTS

JP    9-046522    2/1997

(Continued)

OTHER PUBLICATIONS

T. Mitsa, et al., "Digital Halftoning Using a Blue Noise Mask", 1991, pp. 47-56.

(Continued)

*Primary Examiner* — Twyler L Haskins
*Assistant Examiner* — Michael Burleson
(74) *Attorney, Agent, or Firm* — Fitzpatrick, Cella, Harper & Scinto

(57) ABSTRACT

A data processing apparatus uses a pattern table arranging binarizing patterns correspondingly to positions of a pixel, each of which is used for a binarization process in which an arrangement of a number of dots depending on a value of multi-valued image data corresponding to the pixel is determined, to select the binarizing pattern depending on the position of the pixel and on the value of multi-valued image data corresponding to the pixel for executing the binarization process. The pattern table corresponding to one of the values to be taken by the multi-valued image data includes a plurality of types of binarizing patterns which determine different arrangements of dots from each other. The arrangement of each of the plurality of types of binarizing patterns in the pattern table corresponding to the one value has a characteristic that the arrangement is aperiodic and that low frequency components are fewer than high frequency components.

4 Claims, 14 Drawing Sheets

U.S. PATENT DOCUMENTS

| | | | |
|---|---|---|---|
| 7,405,743 B2 | 7/2008 | Toyama et al. | 347/131 |
| 2003/0067638 A1* | 4/2003 | Yano | 358/540 |
| 2003/0081259 A1* | 5/2003 | Toyoda et al. | 358/3.16 |
| 2008/0310873 A1* | 12/2008 | Ono | 399/74 |

FOREIGN PATENT DOCUMENTS

| | | |
|---|---|---|
| JP | 2001-054956 | 2/2001 |
| JP | 3610250 | 10/2004 |
| JP | 2007-062096 | 3/2007 |

OTHER PUBLICATIONS

Japanese Office Action dated Sep. 8, 2009, in related corresponding Japanese Patent Appln. No. 2007-104266 (with English translations).

* cited by examiner

|  | GROUP #1 | GROUP #2 | GROUP #3 | GROUP #4 |
|---|---|---|---|---|
| LEVEL "0" | | | | |
| LEVEL "1" | | | | |
| LEVEL "2" | | | | |
| LEVEL "3" | | | | |
| LEVEL "4" | | | | |

FIG.3

DATA PROCESSING APPARATUS AND METHOD OF EXPANDING DOT ARRANGEMENT PATTERNS

BACKGROUND OF THE INVENTION

1. Field of the Invention

The present invention relates to a data processing apparatus and a method of expanding dot arrangement patterns, and more particularly to those expansion patterns of dot arrangement patterns which are employed for binarizing image data that has been quantized.

2. Description of the Related Art

With the recent spread of information processing equipment such as personal computers, printing apparatuses for printing images also have been developed and have come into wide use rapidly in various forms of types, contents, etc. Among the various printing apparatuses, especially an ink-jet printing apparatus, which ejects ink from an ejection opening so as to perform printing on a printing medium such as paper, cloth, a plastics sheet or a sheet for OHP, has become a mainstream printing apparatus. The apparatus of this type has the very excellent advantages of being a printing scheme of non-impact type which emits low noise, being capable of a high-density and high-speed printing operation, being easily adapted for color printing, being low in price, and so forth.

In the ink-jet printing apparatus having such advantages, the resolution of an image is increased by making ink droplets smaller, whereby the image quality of the printed image, etc. is still improved. Due to such a higher resolution, however, the quantity of data to be processed in the apparatus becomes enormous. As a result, a print system which includes the ink-jet printing apparatus and a host apparatus such as a computer or the like creates problems that a processing time period in the host apparatus, the time period of data transfer from the host apparatus to the ink-jet printing apparatus, etc. become long. A further problem is that a memory capacity required in the ink-jet printing apparatus needs to be enlarged, and thus an increase in cost is caused.

A method which performs binarization by employing dot arrangement patterns is effective for such problems. With this method, image data are quantized at a comparatively low resolution in, for example, the host apparatus. Then, the quantized multiple-valued image data are transferred to the ink-jet printing apparatus, and the image data received by the printing apparatus are expanded into binary (dot) data by employing the dot arrangement patterns (refer to Japanese Patent Laid-Open No. 09-046522 and Japanese Patent Laid-Open No. 3,610,250). Since the binarization employing the dot arrangement patterns processes and transfers the data of the low resolution in this manner, the data processing and transferring time periods can be prevented from becoming very long, and the memory capacity in the printing apparatus can be made small.

However, the prior-art binarization process employing the dot arrangement patterns may cause problems, especially in the way of expanding the patterns.

FIGS. 1A and 1B are diagrams for explaining the way of expanding dot arrangement patterns in the prior art.

FIG. 1A shows the dot arrangement patterns for binarizing data that has been quantized to be five values, and the dot arrangement patterns correspond to level "1" among the five values (levels "0"-"4"). In the figure, each part painted black indicates ("1") binary data for forming a dot, and each white part indicates ("0") binary data which does not form the dot. As just described, the dot arrangement patterns exemplified in the figure are configured in units of (two constituent pixels)× (two constituent pixels). Using these patterns can allow data processing, data transfer, etc. to be executed at a resolution of ½ in both length and width, with respect to binary image data which are finally obtained by expanding the pattern.

The dot arrangement patterns as stated above are expanded for quantized multiple-valued data, as described below. When the multiple-valued data of the level "1", for example, is inputted, one of the patterns A, B, C and D exemplified in FIG. 1A is selected in correspondence with the pixel position of the multiple-valued data, and dot data is set at a pixel of double resolution in both the length and width (size of 2 constituent pixels×2 constituent pixels) corresponding to the multiple-valued data.

As a method of arranging or expanding patterns for the respective pixel positions for selecting the dot arrangement pattern, there has been known a method (hereinafter, also referred to as "tile expansion") wherein the patterns are periodically arranged or expanded as shown in FIG. 1B. Alternatively, there has been known a method (hereinafter, also referred to as "pseudo-random expansion") wherein pseudo-random numbers are generated for A, B, C and D representative of patterns, and the patterns A, B, C and D are arranged or expanded in accordance with the random numbers. In the binarization process, one dot arrangement pattern is selected correspondingly to the pixel position of the multiple-valued data, in accordance with the expansion patterns of the patterns A, B, C and D whose arrangements are determined as stated above. More specifically, in a case where the multiple-valued data are of five values, the patterns A, B, C and D are determined for each of the levels "0"-"4", one of the patterns A, B, C and D corresponding to the level indicated by the inputted multiple-valued data is selected in the above stated way.

However, in the case where the dot arrangement pattern is selected in accordance with the expansion patterns in the prior art, a deviation sometimes occurs in formed dots, resulting from the method of selecting the dot arrangement pattern in the expansion patterns. By way of example, in the case of employing the periodic expansion patterns as shown in FIG. 1B, a texture sometimes appears in an image actually printed by a printing apparatus. More specifically, when the landing positions of ink deviate due to the errors of the ejection precision of a print head and the precision of the printing apparatus, the deviations appear as the periodic deviation of the dots, and the deviation is visually recognized as the texture in some cases. Further, in the case of employing the expansion patterns based on the pseudo-random numbers, several dots deviate to form bulk dots, and the bulk dots are visually recognized as a granular feeling in some cases.

As stated above, with any type of expansion patterns in the prior art, the plurality of species of dot arrangement patterns for each level, such as the patterns A, B, C and D, are not arranged in appropriately dispersed fashion, so that the deviation occurs in the formed dots and degrades an image quality in a printed image.

Further features of the present invention will become apparent from the following description of exemplary embodiments with reference to the attached drawings.

SUMMARY OF THE INVENTION

An object of the present invention is to provide a data processing apparatus and a method of expanding dot arrangement patterns which can prevent the deviation of formed dots from occurring in a binarization process employing the dot arrangement patterns.

In a first aspect of the present invention, there is provided a data processing apparatus that selects a dot arrangement pattern corresponding to a pixel position and a level indicated by image data of the pixel position to execute a binarization process, by using an expansion pattern in which arrangements of a plurality of dot arrangement patterns are determined according to pixel positions for each of the levels indicated by the image data, wherein the arrangement of each of the plurality of dot arrangement patterns in the expansion pattern has a characteristics that the arrangement is aperiodic and that low frequency components are fewer than high frequency components.

In a second aspect of the present invention, there is provided a method of expanding dot arrangement patterns by using an expansion pattern in which arrangements of a plurality of dot arrangement patterns are determined according to pixel positions for each of levels indicated by image data, wherein the arrangements of the plurality of dot arrangement patterns in the expansion pattern are determined so that the arrangement of each of the plurality of dot arrangement patterns has a characteristics that the arrangement is aperiodic and that low frequency components are fewer than high frequency components.

According to the above configurations, each arrangement of a plurality of dot arrangement patterns in expansion patterns used for the selection of the dot arrangement patterns is an aperiodic arrangement in which low frequency components are fewer than high frequency components. Thus, dot data (binary image) which are formed on the basis of the dot arrangement patterns selected in accordance with the expansion patterns is of aperiodic in arrangements and is highly dispersed. As a result, the appearance of a texture due to the landing position deviation of ink, etc. can be reduced.

BRIEF DESCRIPTION OF THE DRAWINGS

FIG. 3 is a diagram showing the four groups of the index patterns of the respective levels "0"-"4" of five-valued image data, according to one embodiment of the invention;

DESCRIPTION OF THE EMBODIMENTS

Embodiments of the present invention will be described below in detail with reference to the drawings.

Figures 1A, 1B:
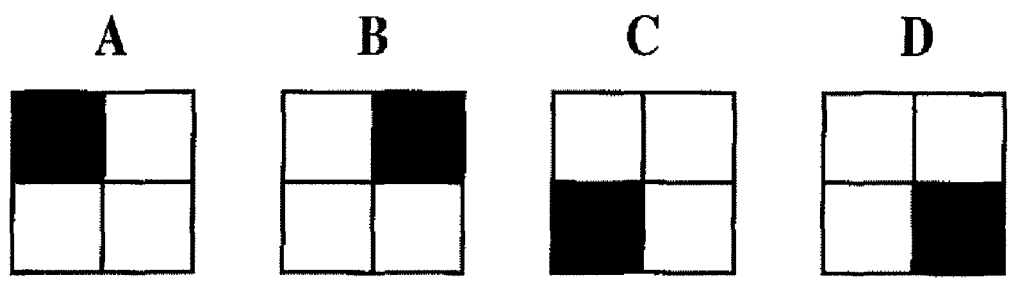
FIGS. 1A and 1B are diagrams for explaining the way of expanding index patterns in the prior art.
Figure 2:
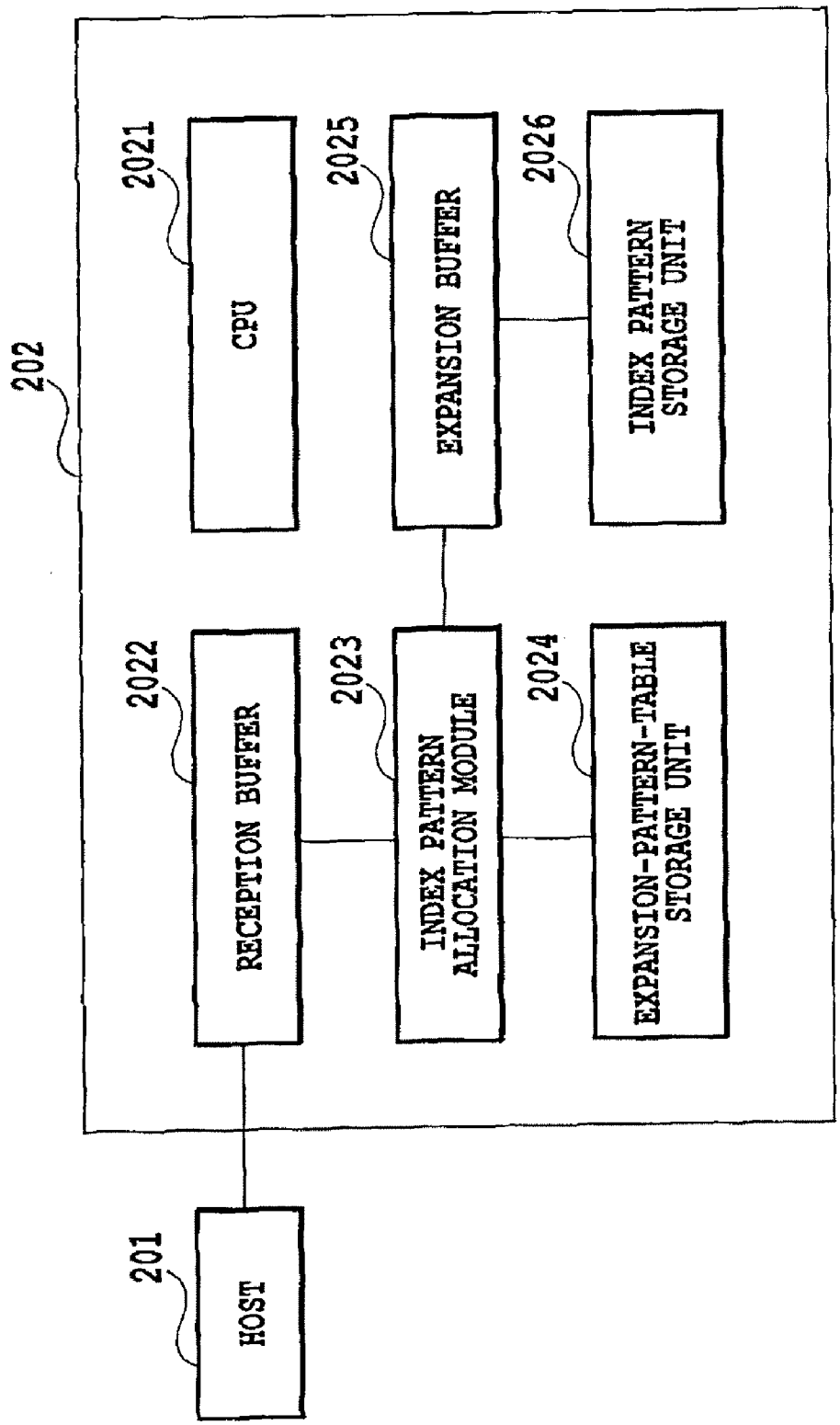
FIG. 2 is a block diagram showing the configuration of a binarization process which employs index patterns chiefly in an ink-jet printing apparatus, according to one embodiment of the present invention.

FIG. 2 is a block diagram chiefly showing the configuration for a binarization process which employs dot arrangement patterns (hereinafter, also referred to as "index patterns") in an ink-jet printing apparatus, according to one embodiment of the invention.

As shown in the figure, a printing apparatus 202 of this embodiment receives five-valued quantized image data as to each of signals Y, M, C and K, from a host apparatus 201, and it ejects respective inks Y, M, C and K from print heads on the basis of the data, thereby to perform printing on a printing medium. In more detail, a reception buffer 2022 receives the five-valued image data from the host apparatus 201. Then, an index pattern allocation module 2023 is executed, whereby the index patterns are allocated to the five-valued image data in the reception buffer 2022. This process is performed using the index patterns and a table of expansion patterns which is to be stated in each of the embodiments described below. An expansion-pattern-table storage unit 2024 stores the expansion pattern table therein, and an index pattern storage unit 2026 stores the index patterns therein. Dot data which are results binarized by using the index patterns (dot arrangement patterns) allocated by the index pattern allocation module 2023 are expanded in an expansion buffer (print buffer) 2025. Then, the inks are ejected from the print head on the basis of the respective dot data Y, M, C and K thus obtained, so as to perform printing.

A CPU 2021 controls the execution of the expansion process of the index patterns (dot arrangement patterns) in each of the embodiments described below. The control configuration of the printing apparatus 202 having the CPU 2021 in this manner constitutes a data processing apparatus concerning the expansion process of the index patterns. The CPU 2021 executes, not only the process control, but also known controls such as the printing operation employing the print head in the printing apparatus 202. It should be noted that, in this embodiment, the host apparatus 201 creates the quantized data of five-value and transmits the data to the printing apparatus 202, however application of the present invention is not limited to this aspect. The host apparatus 201 may well execute operations up to the expansion process of index patterns described later in each of the embodiments, so as to transmit resulting binary data (dot data) to the printing apparatus 202. In this case, the host apparatus 201 constitutes a data processing apparatus concerning the expansion process of the index patterns.

Figure 4A:
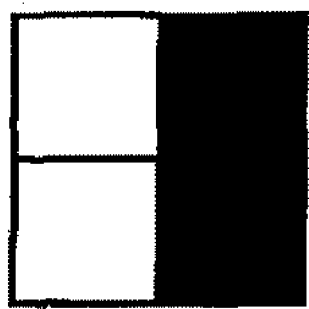
FIGS. 4A and 4B are diagrams each showing another example of the index pattern according to one embodiment of the invention.
Figure 4B:
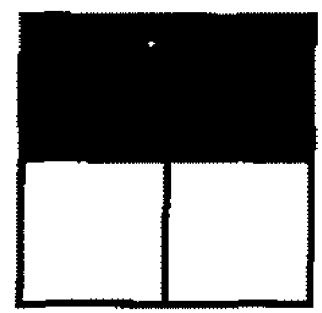

In this embodiment, as shown in FIG. 3 by way of example, index patterns (dot arrangement patterns) corresponding to the levels "0"-"4" of five-valued image data are stored for each of four groups, in the index pattern (dot arrangement pattern) storage unit 2026. That is, in this embodiment, four species of patterns exist for each level (substantially one species for each of the levels "0" and "4"), and they are selected in accordance with the expansion patterns (for example, expansion patterns shown in FIG. 14) of each of the embodiments described below. The index patterns of the level "2" include also patterns shown in FIGS. 4A and 4B, and they can also be used. Further, the number of groups is not limited to four, but it can be determined in accordance with the number of levels based on quantization and the number of index patterns corresponding thereto. In addition, in the example shown in FIG. 3, the dot arrangement pattern of each level has a relation in which the preceding level is conserved. In, for example, the group #1, the dot positions of the pattern of the level "2" are left upper and right lower positions. Here, the left upper dot is arranged while maintaining the left upper dot of the level "1" of the same group #1 as it is, and it conserves the preceding level. Of course, however, the relation of such level conservation need not be kept in applying the present invention.

In the ensuing description, several embodiments will be explained concerning expansion patterns whose arrangements are determined in order to select index patterns for use in the above printing system, or a method of creating the expansion patterns. The basic method of the expansion pattern creation and the concepts of repulsive force computations for use in the method, etc. will be explained beforehand.

(Method of Creating Expansion Patterns)

In the description of the basic expansion pattern creating method, expansion patterns which determine how to arrange index patterns (dot arrangement patterns) shall be sometimes referred to as "planes" for the simplification of the description.

In the method of creating the expansion patterns according to the embodiment of the invention, the planes of the expansion patterns for the respective groups of the index patterns are first set for each of levels. In the example shown in FIG. 3, the four planes of the groups #1-#4 are set for each of the levels "0"-"4". For the simplification of the description, there will be explained a case where the number of the planes is three. First, the three planes of planes A1, A2 and A3 are set as shown in FIGS. 5A-5D. Then, repulsive forces are exerted between the index patterns within the identical plane and between the index patterns in the respective different planes. Also, the superposition of the index patterns of the different planes is permitted, and a repulsive force is exerted between such superposed index patterns. Thus, the arrangements of the index patterns within the respective planes are determined. In FIGS. 5A-5D, the smallest square shown in black or by hatched lines indicates positions of the index pattern in the plane, irrespective of the content of that index pattern.

A method of determining the arrangements of the index patterns in the planes is broadly classified into two methods; a method which simultaneously determines arrangements of a plurality of planes (simultaneous generation), and a method which sequentially determines the arrangements of the respective planes (plane-by-plane generation). Moreover, for each of the above two generation methods, a manner of determining the arrangement of index patterns includes a method of arranging all the index patterns in the expansion pattern in a predetermined way and moving the arrangement, while making the entire expansion pattern being generated more dispersive (this method is hereinafter be referred to as an "arrangement moving method"). As other method, a method can be executed in which each index pattern is placed while making the entire expansion pattern being generated more dispersive (this method is hereinafter referred to as a "sequential arrangement method").

Arrangement Moving Method

The outline of an arrangement determination process for index patterns that is based on the arrangement moving method is as stated below.

For example, in case of determining the arrangements of the index patterns in the plane whose arrangement rate is 50%, an initial arrangement in which 1 bit data each being "1" are allocated at 50% of allocable positions is obtained by a binarization process, such as an error diffusion method, as to each of planes A1, A2 and A3. Then, the index patterns are arranged at positions where the data are arranged, thereby to obtain the initial arrangements of the index patterns. It should be noted that the reasons why the initial arrangements of the index patterns are obtained by employing the binarization technique are that the arrangements whose dispersiveness is favorable in an initial state to some extent can be obtained in correspondence with the binarization technique employed, and that a calculation time period or convergence time period till the final arrangement determination can be shortened in this way. In other words, the method of obtaining the initial arrangements is not essential in applying the present invention, but it is also allowed to adopt, for example, an initial arrangement in which the 1 bit data being "1" are allocated at random in the plane of the expansion pattern.

Then, a repulsive potential is calculated for all the index patterns in each of the planes A1, A2, A3 obtained as described above. Specifically, (i) Repulsive force is applied to the index patterns of the same plane depending on the distance between these index patterns.
  (ii) Also, repulsive force is applied to the index patterns of different planes.
  (iii) Different repulsive force is applied for the same plane and the different planes.
  (iv) Index patterns of different planes are allowed to overlap one another, and repulsive force is applied to overlapping index patterns (two, three, or more index patterns) according to combinations of the overlapping index patterns.

Figure 6:
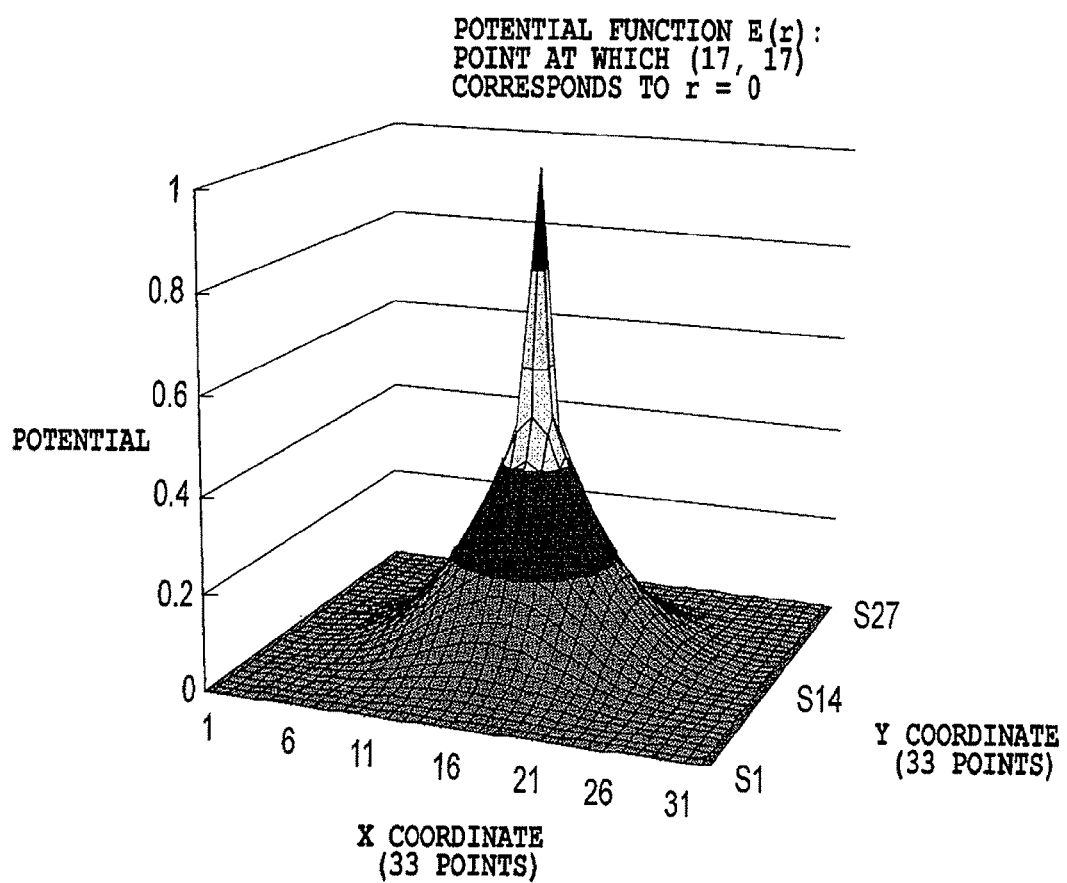
FIG. 6 is a diagram showing the function of a basic repulsive potential E(r) according to one embodiment of the invention, in model-like fashion.

FIG. 6 is a diagram schematically showing a function for a basic repulsive potential E(r) according to the present embodiment.

As shown in FIG. 6, for the repulsive force function that is defined in the present embodiment, the coverage of the repulsive force is up to r=16 (16 positions on which index patterns are arranged). The potential that attenuates depending on the distance basically brings a high energy state, that is, an unstable state when index patterns are arranged close to one another. Thus, the convergence calculation makes it possible to avoid selection of a dense arrangement as much as possible. The shape of the repulsive force is more desirably determined by the ratio of the index patterns to all the allocable positions.

Further, in the case of considering the arrangement of the index pattern in which plural index patterns overlap one another, it may occur that the number of positions where index patterns are arranged exceed that of positions where index patterns can be arranged (for a resolution of 1200 dpi (dot/inch), 1200×1200 possible positions in a 1-inch square), and then the arranged index patterns are made overlapped each other. Accordingly, in calculating the repulsive potential of each index pattern, considerations need to be given for possible overlapping of index patterns each other. Thus, the function is defined so as to have a finite repulsive potential at r=0. This enables dispersion with possible overlapping of index patterns taken into account.

The present embodiment executes calculations such that a repulsive potential αE(r) is applied to the index patterns on the same plane, a repulsive potential βE(r) is applied to the index patterns on different planes, and a repulsive potential γs(n)E(r) is applied to overlapping index patterns. More specifically, a repulsive potential resulting from the presence of a certain index pattern is what is obtained by adding following potentials to the above repulsive potential: the repulsive potentials of index patterns on the same plane, index patterns on different planes, and an overlapping index patterns on different planes, respectively within the distance r from the certain index pattern.

For the above repulsive potentials, coefficients α, β, and γ are weighting coefficients and in the present embodiment, α=3, β=1, and γ=3. The values α, β and γ affect the dispersiveness of index patterns. The values α, β and γ can be actually determined by, for example, experimental optimization based on print images printed using the expansion patterns.

The coefficient s(n) is used for an multiplying in addition to γ in order to disperse overlapping index patterns. The coefficient s(n) has a value corresponding to the number of overlaps so as to increase the degree of dispersion of the index patterns consistently with the number of overlaps. The present inventor experiments show that an appropriate dispersion can be achieved by using s(n) determined by either of the two equations:

$$s(n) = \sum_{i=1}^{n} nCi \text{ or } s(n) = \sum_{i=1}^{n-1} nCi \qquad \text{[Equation 1]}$$

That is, when the n denotes the number of overlaps, the sum of numbers of combinations is denoted by s(n). Specifically, for an object index pattern for which repulsive force is to be calculated, overlapping index patterns (which are located at the same position as that of the object index pattern on the same plane or different planes) and overlapping index patterns located at the distance r from the object index pattern are searched. In this case, n denotes the number of overlaps common to overlapping of the object index pattern and the index pattern on the same plane and the different planes, which overlap the object index pattern at the same position, and overlapping of the index patterns which are located at the distance r from the object index pattern, on respective planes, and overlap each other in the same manner. Then, for these two positions, repulsive forces resulting from the overlapping index patterns are considered.

In the case of considering an example in which for two positions, index patterns are present commonly on plane A1, plane A2 and plane A3, n is defined as 3. Then, repulsive force attributed to the overlapping of the three index patterns is allowed to act on these positions. Here, when the repulsive force resulting from the overlapping of the three index patterns is considered, the repulsive force of the overlapping of every two index patterns and the repulsive force of each index pattern are considered to act in a multiplexing manner together with the repulsive force of the overlapping of the three index patterns. In other words, with the plane A3 not taken into account, the overlapping may be considered to occur between two index patterns on the plane A1 and the plane A2. With the plane A2 not taken into account, the overlapping may be considered to be the one between two index patterns on the plane A1 and the plane A3. With the plane A1 not taken into account, the overlapping may be considered to occur between two index patterns on the plane A2 and the plane A3. To calculate the multiplexing effect of overlapping of the index patterns, the repulsive force resulting from the combination of overlaps is defined and s(n) such as the one described above is used. The experiments show that this makes it possible to provide a highly dispersive index pattern arrangement.

It should be noted that the embodiment of the present invention is related to a process for determining expansion patterns which determine the arrangements of index patterns. Further, the arrangements of the index patterns of a plurality of planes (groups #1-#4) provided with individual levels are complementary. Therefore, the overlapping of the index patterns between the planes need to be excluded. From this viewpoint, in the computations of repulsive potentials, the coefficient γ is set at a value large enough to substantially exclude the overlapping. Alternatively, the overlapping is excluded by processing for the movements of the index patterns.

When the total energy is determined which is equal to the sum of the repulsive potentials of all the index patterns, as described above, processing is executed to reduce the total energy.

This processing involves sequentially shifting each of the index patterns to one of the allocable positions located at a distance r of at most 4, at which position the repulsive potential of the shifted index pattern most decreases. This processing is repeated to reduce the total energy that is equal to the sum of the repulsive potentials of all the index patterns. In other words, the process of gradually reducing the total energy corresponds to the process of sequentially making the arrangement of the index patterns more dispersive, that is, the process of gradually reducing low frequency components of the index patterns.

Then, the rate of a decrease in total energy is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed. Finally, respective planes with the rate of a decrease in total energy equal to or less than the predetermined value are set as final arrangements of the index patterns.

FIGS. 5A to 5D are diagrams schematically showing the repulsive potential calculation and total energy attenuating process, described above. More specifically, these figures include perspective views showing the three planes A1, A2, and A3 according to the present embodiment and plan views specifically showing movement of the index patterns. In the figures, the smallest squares show allocable positions of the index patterns. Positions overlapping each other among three overlapping planes correspond to the same allocable positions among the planes.

Figure 5A:
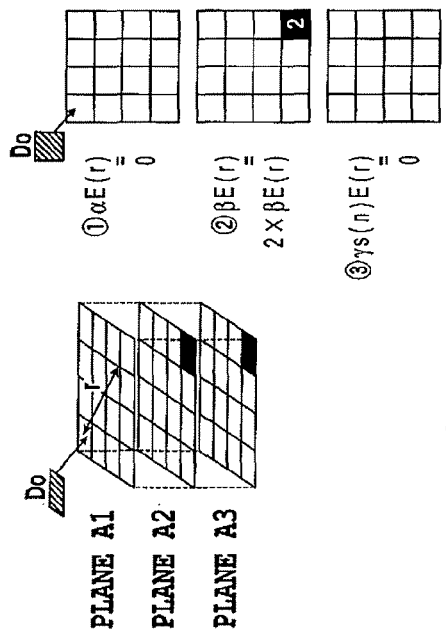
FIGS. 5A-5D are diagrams showing the computations of repulsive potentials and attenuation processes for total energy according to one embodiment of the invention, in model-like fashion.

FIG. 5A illustrates that when index patterns are present on the same plane, the repulsive force of these index patterns is added to (increases) the repulsive potential. In the example shown in the figure, one index pattern is present on the same plane A1 on which the index pattern Do of an object position is present at the distance r from that position. In this case, $\alpha=3$ is applied, and a potential $1 \times \alpha E(r)$ is added as the potential of the object index pattern Do.

Figure 5B:
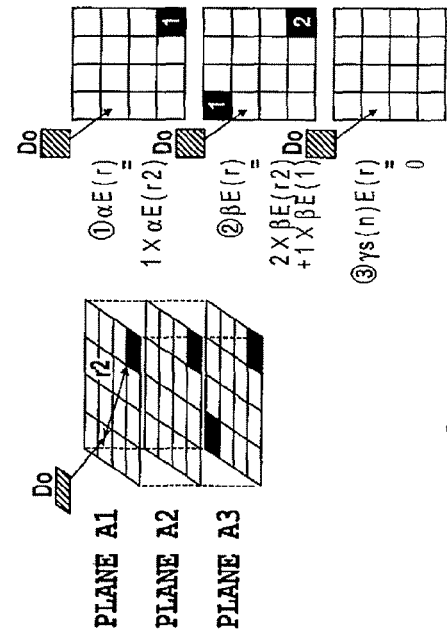

FIG. 5B is a diagram illustrating that index patterns are present on planes (planes A2 and A3) different from that on which the object index pattern Do is present and that a repulsive potential is added on the basis of the relationship between the object index pattern and these two index patterns. The relationship between the object index pattern and these two index patterns is that between different planes. Then, $\beta=1$ is applied and a potential $2 \times \beta E(r)$ corresponding to the two index patterns is added.

Figure 5C:
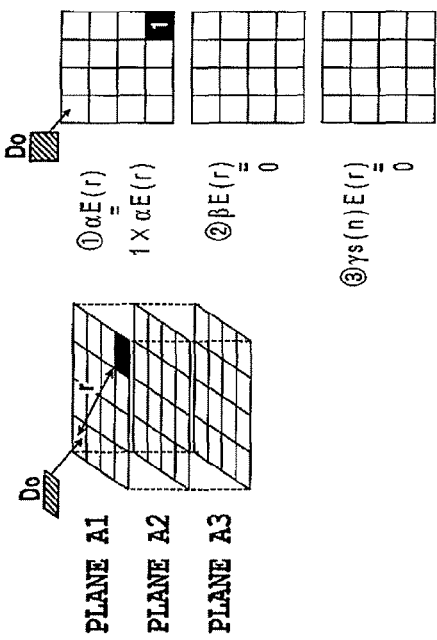

FIG. 5C is a diagram illustrating that index patterns are present on the same plane on which the object index patterns is present and on planes different from that on which the object index pattern is present as is the case with the above two figures, and in addition, a index pattern is present on the same position of a different plane and then that index pattern and the object index pattern overlap each another, and illustrating the repulsive potential based on the relationship among these index patterns. Not only the conditions shown in FIGS. 5A and 5B are met but an index pattern is present at the same position on the plane A3, which is different from the plane A1 with the object index pattern Do present. Thus, the following potentials are added: the repulsive potential $1 \times \alpha E(r)$ of one index pattern on the same plane, the repulsive potential $1 \times \beta E(0)$ of one index pattern on the different plane at the same position, the repulsive potential $2 \times \beta E(r)$ of two index patterns on the different planes, and the repulsive potential $\gamma s(2) \times E(r)$ of overlapping to which $\gamma=3$ is applied at a overlap number $n=2$. As s result, in the index pattern arrangement shown in FIG. 5C, the sum of the repulsive potentials associated with the presence of the object index pattern Do is $1 \times \beta E(0) + 1 \times \alpha E(r) + 2 \times \beta E(r) + \gamma s(2) \times E(r)$.

Figure 5D:
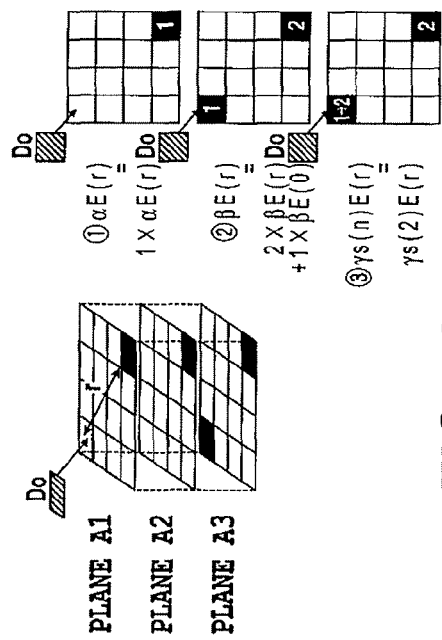

FIG. 5D is a diagram illustrating that in the index pattern arrangement shown in FIG. 5C, movement of the index pattern Do changes the sum of repulsive potentials of this index pattern. As shown in FIG. 5D, when the index pattern Do (located on the plane A1) shifts to an adjacent position on the same plane, the sum of the repulsive potentials associated with the presence of the index pattern Do changes into $\beta E(1) + 1 \times \alpha E(r2) + 2 \times \beta E(r2)$ because the distance changes into r2 from r and the number n of overlaps becomes 0. For the index pattern arrangement shown in FIG. 5C, the sum of the repulsive potentials $1 \times \beta E(0) + 2 \times \alpha E(r) + 1 \times \beta E(r) + \gamma s(2) \times E(r)$ is compared with the sum of the repulsive potentials resulting from movement of the index pattern Do in FIG. 5D. This determines a change in the sum of the repulsive potentials after the movement.

In the above description, the sum of the repulsive potentials is obtained by determining the sum of energies of the index patterns between two positions, or of the index patterns among three positions when the index pattern is moved. However, this is for simplification and the sum of the repulsive potentials is of course obtained by integrating the repulsive potentials on the basis of the relationship between the index pattern of interest and index patterns including those of other possible positions other than the above index patterns.

If, of the index patterns for each of which the sum of the repulsive potentials is calculated as shown in FIGS. 5A to 5C, for example the index pattern Do shows the largest repulsive potential sum, changes in repulsive potential after the movement of the position of the pattern Do is determined as described in FIG. 5D and the index pattern Do is moved to the position with most decreasing of repulsive potential sum. This processing is repeated to enable a reduction in the total energy of the three planes. That is, the index pattern arrangement of the superposing of the three planes is appropriately distributed with few low frequency components.

Sequential Arrangement Method

This method is a method which sequentially arranges index patterns in a part of a plane where no index patterns have been arranged yet, as described above. This method sequentially places an index pattern on three planes one by one, for example, shown in FIGS. 5A to 5C and repeats this operation to arrange the index patterns according to arrangement rate of each plane. In this case, before a index pattern has been arranged, calculation is made of the possible repulsive potential between the index pattern of that position and each of the index patterns already arranged on the planes A1, A2, and A3. The repulsive potential can be calculated in the same manner as described above for the arrangement moving method. The difference between the present method and the arrangement moving method is that with reference to the example shown in FIGS. 5A to 5C, if in contrast to the above arrangement moving method, the index pattern Do, shown in these figures, has not been placed yet but is to be newly placed, the repulsive potential is calculated on the basis of the relationship between the index pattern Do and index patterns already arranged on the same plane A1 and on the different plane A2 or A3. As is also apparent from the description, at the initial stage where no index patterns have been arranged yet, the repulsive potential has the same value regardless of the position of the index pattern.

Next, among the repulsive potentials calculated under the assumption that the index pattern is placed on each of positions of the planes, a position having the minimum potential energy is determined. If plural positions show the minimum energy, random numbers are used to determine one of the plural positions. In the present embodiment, the position with the minimum energy is determined under the condition that on the same plane, no index pattern is placed on a position on which an index pattern has already been placed. This is because depending on a parameter such as the weighting coefficient or repulsive potential function, in the repulsive potential calculation, overlapping of index patterns on the same plane may result in the minimum energy as a result of the relationship between the object index pattern and index patterns on the other planes and because in this case, the overlapping is prohibited because only one index pattern is allowed to be placed on one position. An index pattern is placed on the determined position with the minimum potential energy. That is, data on that position is set to "1". Then, the method determines whether or not one index pattern has been placed on each of the planes A1, A2, A3. If this placement has not been finished, the processing is repeated.

When one index pattern has been sequentially placed on the planes A1, A2, and A3 in this order, the method determines whether or not index patterns have been arranged on up to 50% of all allocable positions. Once 50% of the index patterns have been arranged on each of the three planes, the present process is finished.

The above described sequential arrangement method also makes it possible to produce planes having characteristics similar to those of planes produced by the above arrangement moving method. That is, for the three planes obtained by the sequential arrangement method, the index patterns are appropriately dispersed in the superposed planes.

The above plane (expansion pattern) generating methods are further characterized by generating no such a periodic pattern as has regularly repeated index pattern arrangements. These methods do not generate, for example, such a periodic pattern as has repeated any checker pattern or any repeated Beyer type arrangements. Even if such a pattern is generated, re-setting the repulsive potential parameter enables convergence to the state in which generation of period patterns is avoided. Thus, the planes generated by the expansion pattern creating methods according to the present embodiment have aperiodic patterns.

There will now be described expansion-pattern creating methods according to several embodiments of the present invention which employ the above described basic method of creating expansion patterns.

In the above method of creating the expansion patterns, the number of planes has been "3", and the arrangement rate of index patterns in each of the three planes A1-A3 has been "50%". On the other hand, in the embodiments described below, the number of planes is set at "4", and the arrangement rate of index patterns in each of the four planes P1-P4 is set at "25%".

Embodiment 1

Figure 7:
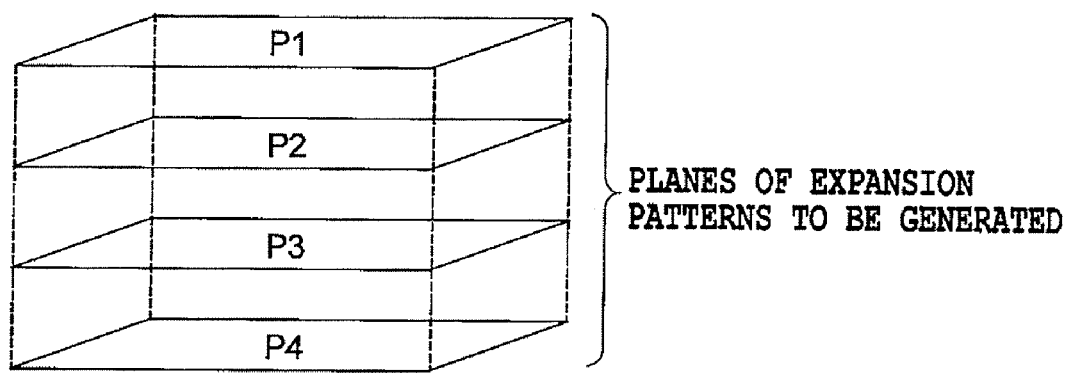
FIG. 7 is a diagram showing a concept for computing repulsive forces which concern the arrangements of index patterns in each of four planes corresponding to the four index-pattern groups of one certain level, according to the first embodiment of the invention.

FIG. 7 is a diagram showing a concept for computing repulsive forces which concern the arrangements of index patterns in each of four planes P1-P4 corresponding to the four index-pattern groups of one certain level, according to the first embodiment of the invention. In a process for determining the arrangements of the index patterns in the four planes, there are computed the repulsive potentials between the index patterns in each plane and the repulsive potentials between the index pattern in one plane, for example, the plane P1 and the index patterns in the other planes P2-P4. Then, the arrangements of the index patterns in the planes P1-P4 are determined on the basis of the results of the above described calculation of the repulsive potentials.

Figure 8:
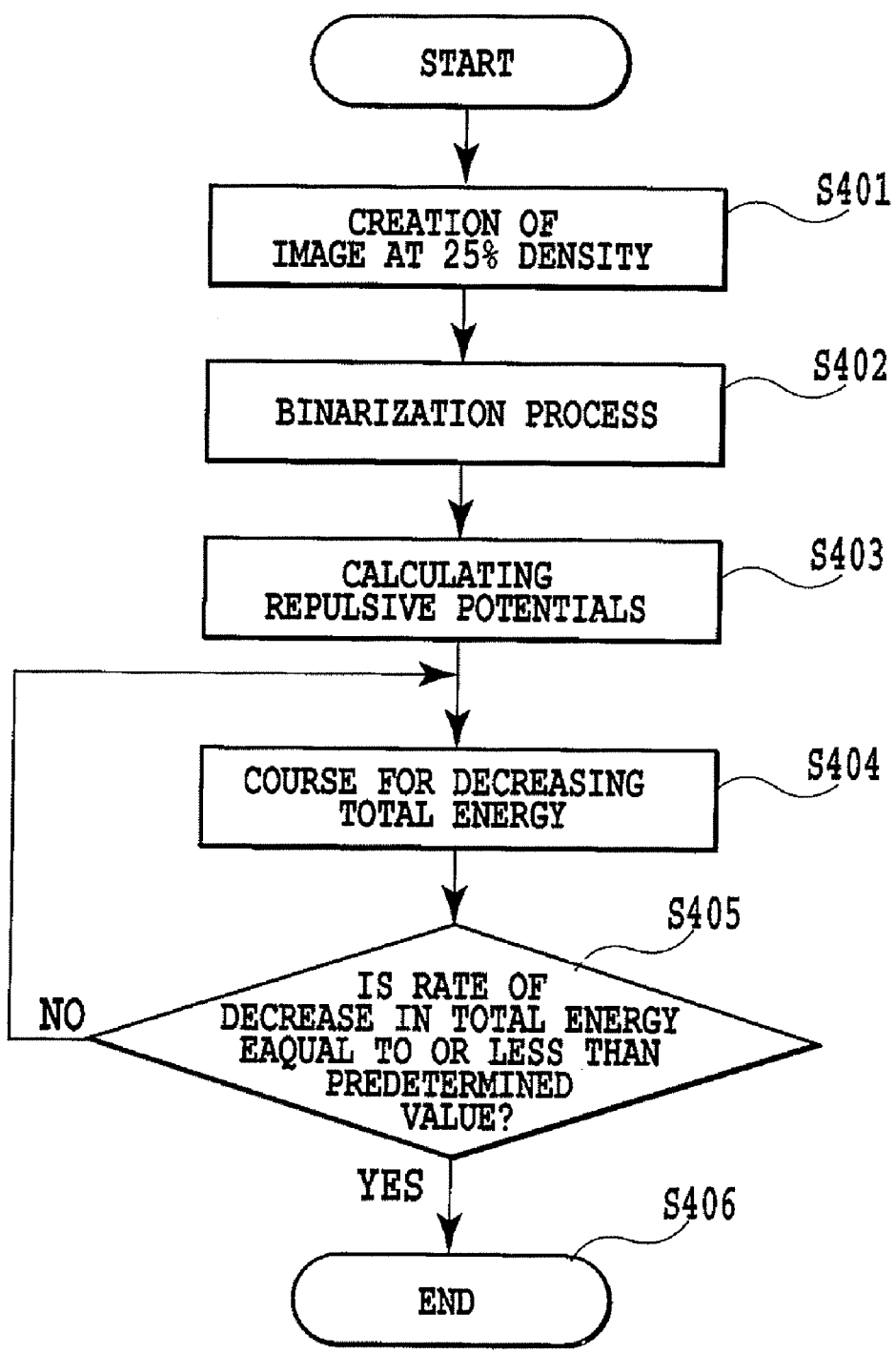
FIG. 8 is a flow chart showing a process for determining the index pattern arrangements in the four planes, according to the first embodiment.

FIG. 8 is a flow chart showing the process for determining the index pattern arrangements in the four planes P1-P4, according to the present embodiment. The process shown in the figure illustrates a method of arranging the index patterns on the basis of the arrangement moving method.

First, at a step S401, an image of gray at a 25% density is obtained. Next, at a step S402, binarization is executed by employing an error diffusion method or the like. Thus, initial arrangements in which the index patterns are arranged at 25% of all allocable positions can be obtained for the respective planes. The initial arrangements may be the same arrangements in the respective planes or may well be different arrangements in them. The reason why the index patterns are arranged in the respective amounts of 25% in this manner is that, in the case where the four groups of the index patterns exist for each level, the index patterns of the respective groups (groups #1-#4 in the example shown in FIG. 3) are arranged at the same rates in all expansion patterns which are finally created. Here, the size of each plane corresponds to 128 pixels×128 pixels in this embodiment, and one pixel corresponds to a resolution of ½ of binary image data in both lengthwise and widthwise directions.

Subsequently, at a step S403, as to all the index patterns in the planes of the groups #1-#4 obtained as stated above, the repulsive potentials are calculated in the way explained before. Thus, total energy which is the sum of the repulsive potentials for all the index patterns is obtained. Further, at a step S404, all the index patterns are successively shifted to positions where the repulsive potentials decrease within a predetermined range. Repetition of this process allows total energy to be decreased. More specifically, the course in which the total energy is decreased gradually and successively is the course in which the dispersiveness of the arrangements of the index patterns is increased in succession, that is, the course in which the low frequency components of the arrangements of the index patterns are decreased.

At a step S405, the decreasing rate of the total energy at the step S404 is calculated. When the decreasing rate is judged to be equal to or less than a predetermined value, the processing of the step S404 is ended at the step S405, so as to determine the table of the final arrangements of the respective planes, that is, the expansion patterns of the respective groups.

Figure 14:
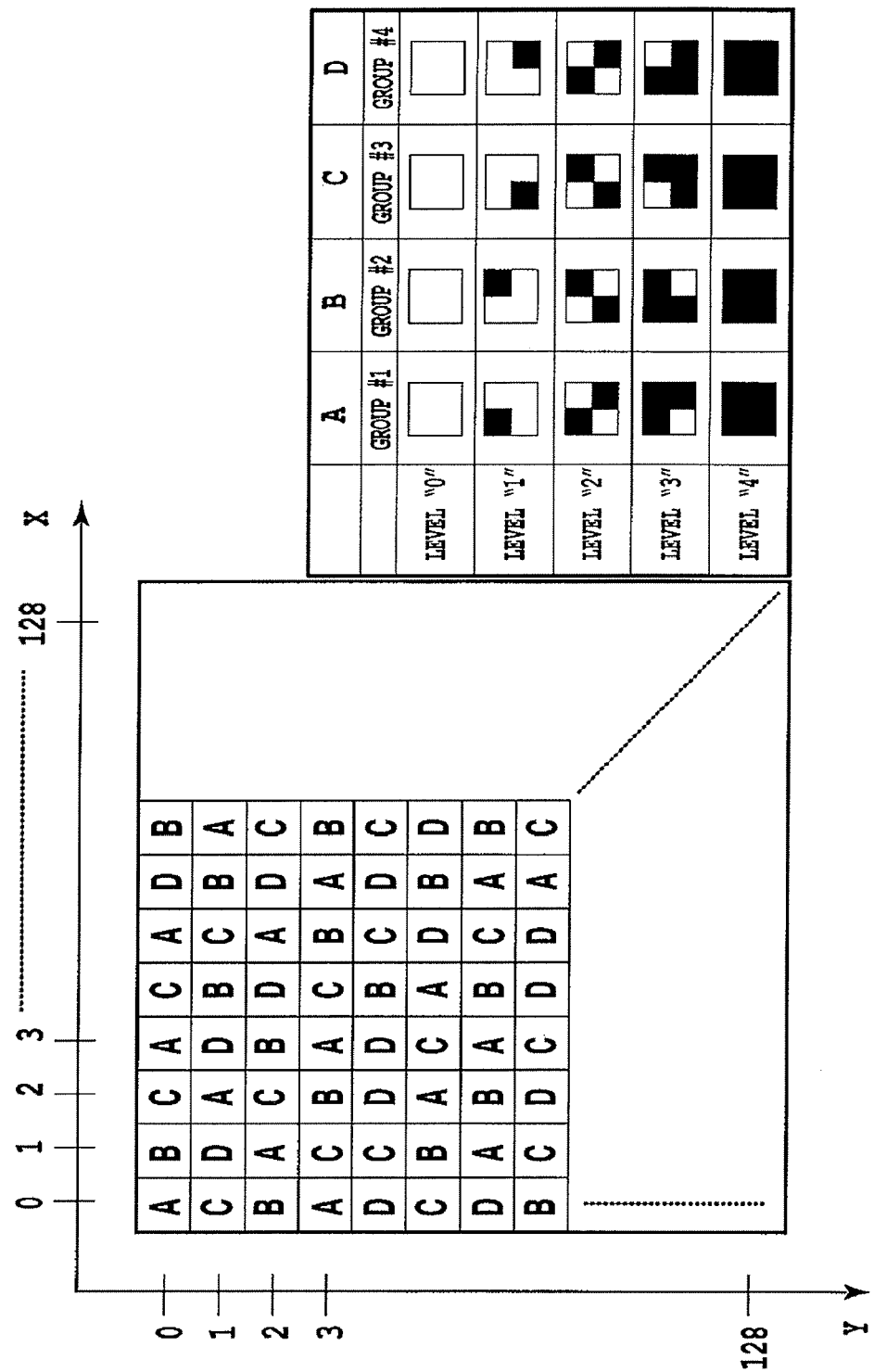
FIG. 14 is a diagram obtained by tabulating the expansion patterns of four groups which have been obtained by the process shown in FIG. 8, and showing the arrangements of four species of index patterns A-D contained in the expansion patterns, in model-like fashion.

The expansion patterns for the four groups #1-#4 (planes P1-P4) can be created for each level by executing the above process. Then, the expansion patterns for each level are set as table data as shown in FIG. 14, and the table is stored in the expansion-pattern-table storage unit 2024 (FIG. 2). It should be noted that, in the example shown in FIG. 3, as to the levels "0" and "4", the index patterns are the same between the groups. In such a case, the expansion patterns of these levels need not especially employ the process of this embodiment stated above. Accordingly, the expansion patterns may be previously determined without resorting to the above process.

FIG. 14 shows the table of the expansion patterns of the four groups #1-#4 as created by the process shown in FIG. 8. FIG. 14 schematically shows the arrangements of the four species of index patterns A-D contained in the expansion patterns. As shown in FIG. 14, in this embodiment, the respective arrangements of the plurality of species (here, four species) of index patterns in the expansion patterns have the characteristics that the arrangements are aperiodic, and that the low frequency components are fewer than high frequency components. The definitions of the "low frequency components" and the "high frequency components" are as will be stated later.

As shown in FIG. 14, the expansion patterns have the index patterns A-D which are associated with pixel positions (X, Y) for the respective multiple-valued levels (levels "0"-"4"). In this embodiment, the index patterns A-D are selected in correspondence with the multiple-valued levels and the pixel positions. For example, if the multiple-valued level of the pixel position (1, 1) is "1", the index pattern D of the level "1" is selected for the pixel position (1, 1). Similarly, if the multiple-valued level of the pixel position (2, 0) is "2", the index pattern A of the level "2" is selected for the pixel position (2, 0). Thus, the dot data (binary image data) of the respective pixels are determined by the index patterns thus selected.

Figure 9:
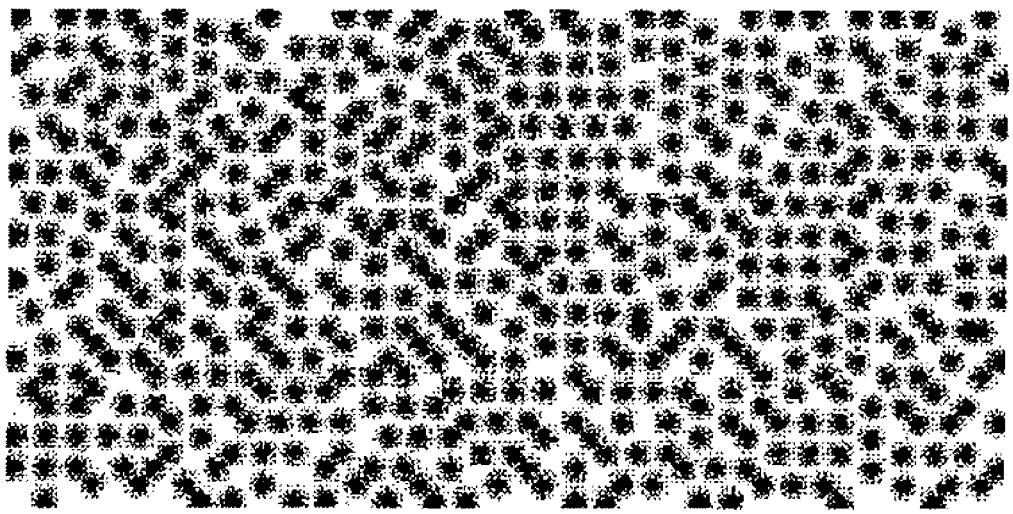
FIG. 9 is a diagram showing the expansion patterns of one plane which have been obtained by the process shown in FIG. 8.
Figure 11:
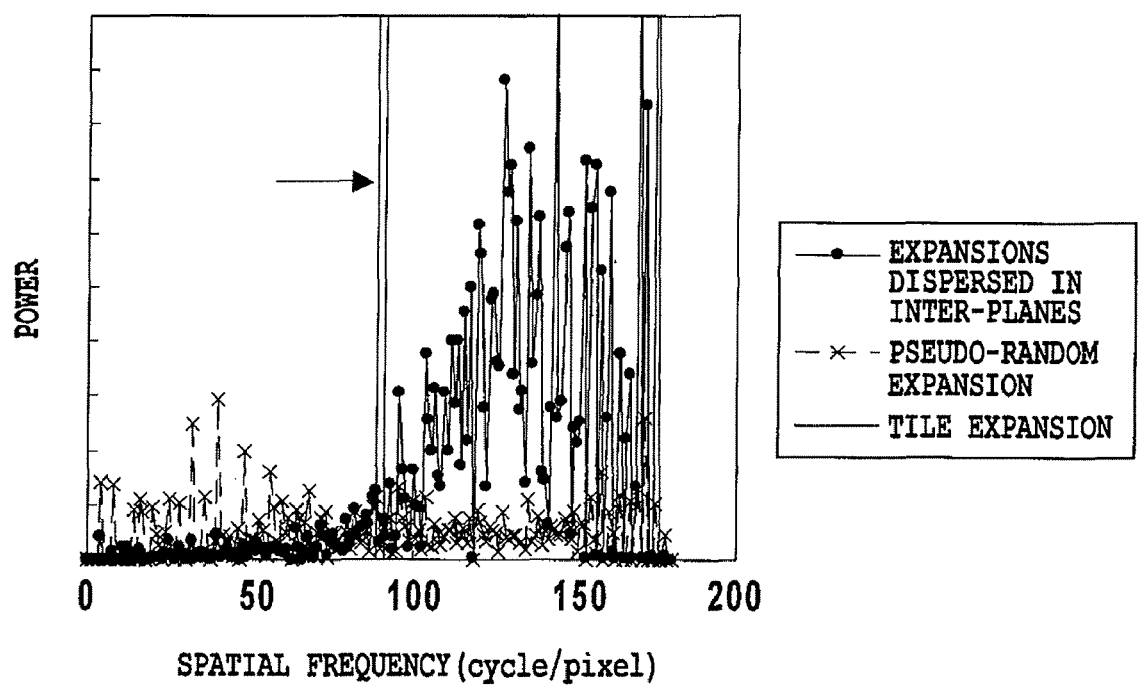
FIG. 11 is a diagram showing a result which has been obtained by conducting a frequency analysis as to the arrangements of the index patterns shown in FIG. 9.

FIG. 9 is a diagram showing in terms of dots, the expansion patterns of one plane 1 (of the index patterns A of the group #1) which are extracted from among the expansion patterns shown in FIG. 14. As seen from FIG. 9, the arrangements of the index patterns of one plane are aperiodic and are appropriately dispersed. This holds true also of the other planes 2-4. In this embodiment in which the arrangements of the index patterns are favorably dispersed, the components of low frequencies are fewer than those of high frequencies as shown in FIG. 11 which will be referred to later. In addition, the fact that the arrangements of the index patterns in the respective planes 1-4 are aperiodic and of the favorably dispersed as stated above signifies that since the arrangements of the index patterns are complementary, the arrangements of the index patterns of the plurality of (four) planes are also aperiodic and of favorably dispersed. Thus, the same index patterns are arranged without deviations.

Next, the arrangements of the index patterns in the expansion patterns of this embodiment will be estimated in terms of a power spectrum which indicates the frequency characteristic of the arrangements. The power spectrum to be explained below is obtained for the arrangements of the index patterns (here, the index patterns A) of one certain group among the expansion patterns having the size of 128 pixels×128 pixels.

Here, the power spectrum is based on a radially averaged power spectrum which is stated in T. Mitsa and K. J. Parker, "Digital Halftoning using a Blue Noise Mask", Proc. SPIE 1452, pp. 47-56 (1991), and in which a two-dimensional spatial frequency can be handled as one dimension.

In this specification, an expression "low frequency area" signifies a frequency area on a side lower than a half in a spatial frequency area in which frequency components exist. In addition, the frequency components which exist in the low frequency area are called the "low frequency components". On the other hand, an expression "high frequency area" signifies a frequency area on a side higher than the half in the spatial frequency area in which the frequency components exist. In addition, the frequency components which exist in the high frequency area are called the "high frequency components".

Further, the fact that "the low frequency components are fewer than the high frequency components" signifies a state where the integral value of the frequency components existing in the low frequency area (the low frequency components) is smaller than the integral value of the frequency components existing in the high frequency area (the high frequency components).

FIG. 11 is a diagram showing a result obtained by conducting a frequency analysis for the arrangements of the index patterns (the index patterns A) shown in FIG. 9 (or FIG. 14). The frequency characteristic which the expansion patterns of this embodiment exhibit is indicated by an "expansion dispersed in inter planes". For the sake of comparisons, the results of frequency analyses based on the prior-art "tile expansion" in which index patterns are periodically expanded, and the prior-art "pseudo-random expansion" in which index patterns are expanded in accordance with the array of pseudo-random numbers, are also shown in FIG. 11.

As shown in FIG. 11, with the prior-art tile expansion, patterns of larger size, in each of which a plurality of index patterns are combined, are periodically repeated, and hence, peaks exist at corresponding frequencies (as indicated by an arrow in the figure). Therefore, the printing is less immune against the ejection precision error of the print head or the mechanical error of the printing apparatus. More specifically, when the landing position deviation of ink occurs due to such an error, it is liable to be visually recognized as a texture. On the other hand, with the pseudo-random expansion, the arrangements of the index patterns are aperiodic, so that even when the landing position deviation of ink occurs, the texture as in the case of the tile expansion is difficult to be visually recognized. Since, however, comparatively large components are contained in the low frequency area, noise is conspicuous, and the existence of a rough touch (granular feeling) is felt.

As compared with the expansion patterns of the two expansion methods in the prior art, the expansion patterns of this embodiment do not contain a peak indicating a periodicity as is contained in the case of the tile expansion. That is, an aperiodic characteristic is exhibited, so that the texture is difficult to appear even when the landing position deviation of ink occurs. Moreover, the expansion patterns of this embodiment have the characteristic that the components of the low frequency area are fewer than those of the high frequency area. Since the low frequency components are little in this manner, it can be said that the deviation of the arrangements of the index patterns is slight, and that the dispersiveness of the arrangements is good. Therefore, the granular feeling as in the case of the pseudo-random expansion is slight.

The frequency characteristic in FIG. 11 as described above has concerned the arrangements of the index patterns A contained in the expansion patterns, but similar results are obtained as to the other index patterns B, C and D. That is, regarding the arrangements of the respective index patterns B, C and D, the arrangements are aperiodic, and low frequency components are fewer than high frequency components.

Figure 10:
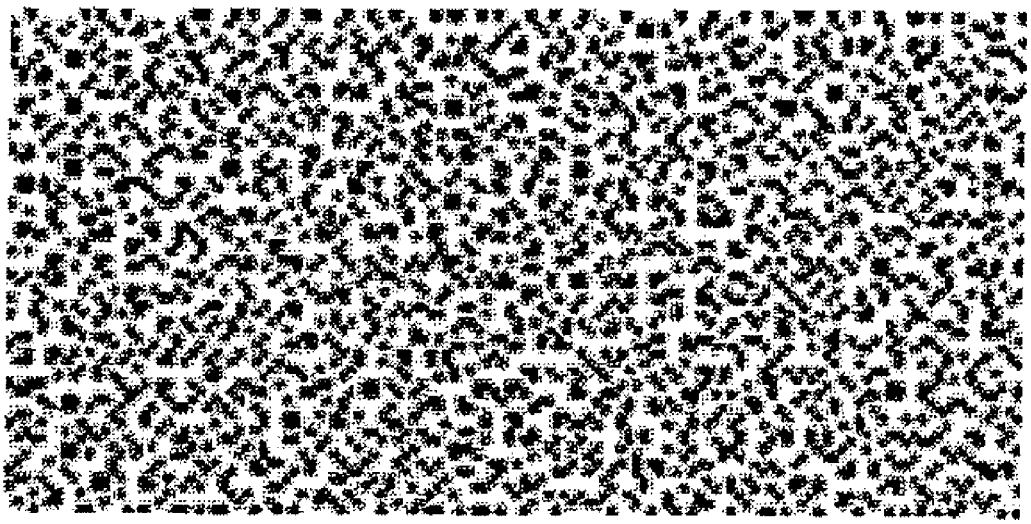
FIG. 10 is a diagram showing dot data (binary image data) which are obtained by binarizing an solid image of level "1" in accordance with an expansion table created by the process shown in FIG. 8.

FIG. 10 is a diagram showing dot data (binary image data) which are obtained by binarizing a solid image of level "1" (an image in which all pixels have data of the level "1") in accordance with the expansion patterns created by the process shown in FIG. 8 (the expansion patterns in FIG. 14). Specifically, one of the index patterns A-D, which corresponds to a position of the pixel indicating the level "1", is selected in accordance with the expansion patterns in FIG. 14, and the selected index patterns are set as the dot data.

As seen from FIG. 10, with the dot data (binary image data) binarized by using the index patterns according to the expansion patterns of this embodiment, dots or large bulk dots in which the dots gather are dispersed. That is, likewise to the arrangements of the index patterns, the arrangements of the dot data become aperiodic and highly dispersed. Incidentally, the frequency characteristic of the dot data is such that low frequency components are fewer than high frequency components, likewise to the frequency characteristic shown in FIG. 11.

Figure 12:
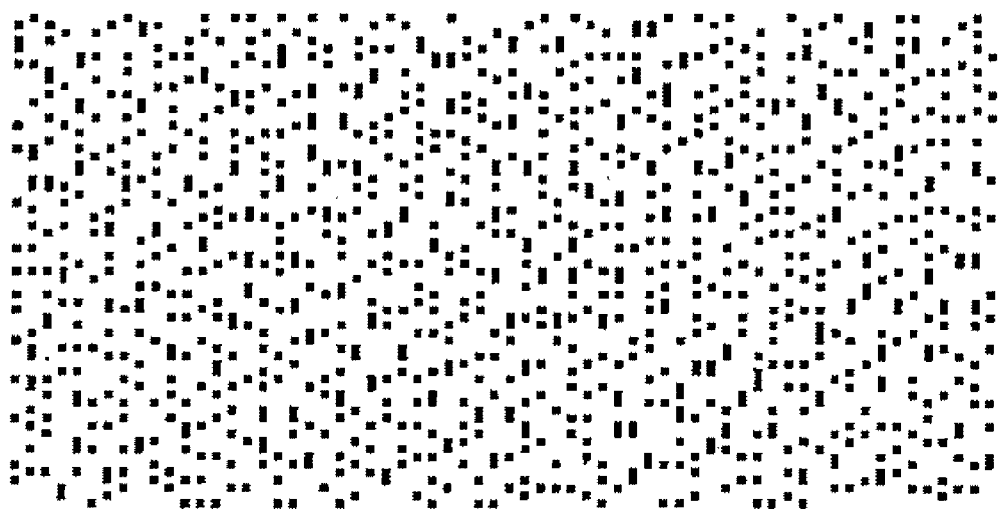
FIG. 12 is a diagram showing the arrangements of dots in the case where the dot data shown in FIG. 10 are divided into even-numbered columns and odd-numbered columns.

FIG. 12 is a diagram showing the arrangements of dots in the case where the dot data shown in FIG. 10 are divided into even-numbered columns and odd-numbered columns. As shown in FIG. 12, even when the dot data are divided in a certain direction, arrangements in which the dots do not deviate can be obtained irrespective of the direction.

According to the present embodiment, as to the arrangements of the index patterns in the respective groups (the respective planes), the calculations of the repulsive potentials are applied within each of the planes and between the planes. Thus, the expansion patterns which are aperiodic and have the little low frequency components can be obtained. It is consequently possible to obtain a binary image which is high in dispersiveness and which is free from the appearance of the texture due to the landing position deviation of ink.

Embodiment 2

A second embodiment of the present invention relates to an aspect in which, in order to make small a capacity occupied by the table of expansion patterns in a memory, the expansion patterns of small size are created and are repeatedly used. A binarization process is executed by repeatedly using the expansion patterns which have the comparatively small size of, for example, 64 pixels in width×32 pixels in height. Index patterns of this embodiment are the same as in the first embodiment described above, and they are the patterns of the four groups #1-#4 shown in FIG. 3, as to each of the levels "0"-"4". Further, the expansion patterns of the index patterns are created substantially similarly to those in the first embodiment.

Different points from the first embodiment are as stated below. The initial image of each plane is created with the size of 64 pixels in width×32 pixels in height at a 25% density. Further, in order to repeatedly use the expansion patterns, the boundary condition that a left end adjoins a right end, while an upper end adjoins a lower end, is set when calculating repulsive potentials. For example, in the calculations of the repulsive potentials, when the index pattern is to be moved to or arranged at a position near the right end, it is set as the boundary condition that the distance of the index pattern from the index pattern already arranged at a position near the left end is set at a short distance in the case of the adjacency between the left end and the right end, not at the distance of the width corresponding approximately to one plane.

Figure 13:
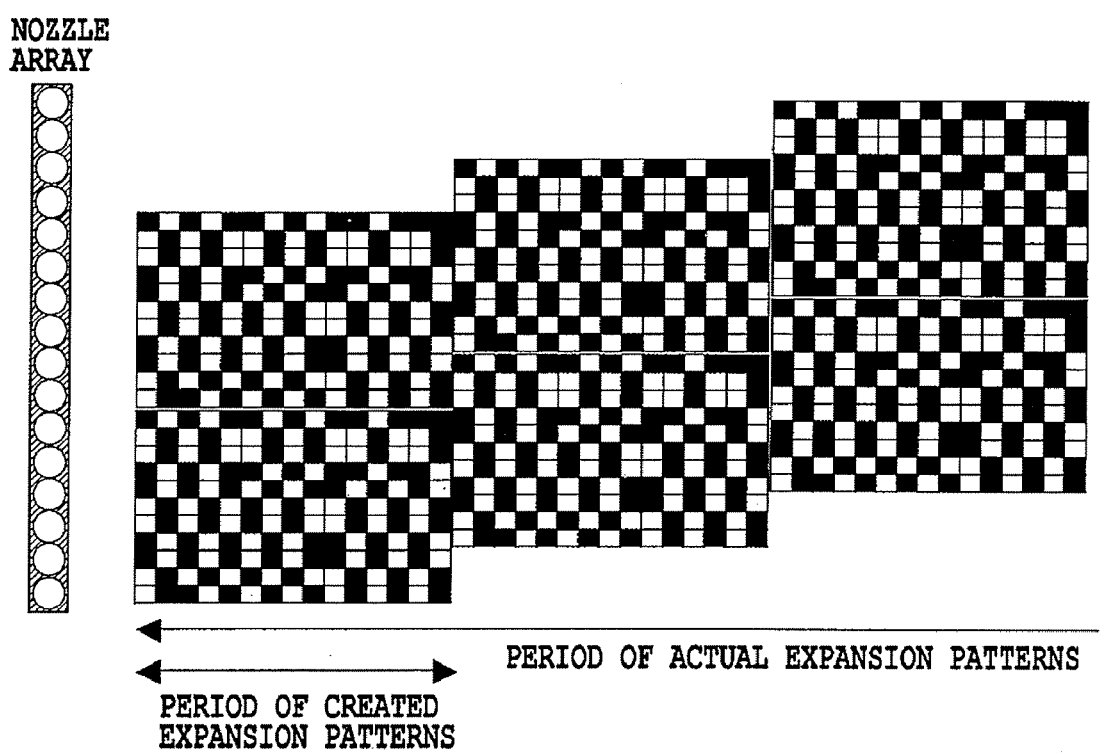
FIG. 13 is a diagram for explaining an example according to the second embodiment of the invention, in which expansion patterns are used by shifting them in the nozzle array direction of a print head.

In the above aspect, in a case where the expansion patterns are used by shifting them in the nozzle array direction of a print head as shown in FIG. 13, the boundary condition corresponding to a shift amount is imposed. Here in FIG. 13, the shifting direction is set at the direction of a nozzle array. However, the shifting direction is not restricted to the nozzle train direction, but it may be a direction perpendicular to the nozzle train, or both the nozzle train direction and the perpendicular direction.

As described above, even when the size of the expansion patterns is made small, the expansion patterns which have the characteristics of the aperiodic arrangements and the little low frequency components as in the case of the first embodiment can be obtained by imposing the boundary condition corresponding to the size, at the computations of the repulsive potentials. It is consequently possible to obtain binary image data which is high in dispersiveness and which is free from the appearance of a texture ascribable to the landing position shift of ink.

Other Embodiments

In each of the foregoing embodiments, the ink-jet printing apparatus has been described as functioning as the data processing apparatus of the invention and executing the binarization process employing the dot arrangement patterns (index patterns) and the processes relevant thereto. However, it is a matter of course that the application of the present invention is not restricted to this configuration. It is also allowed to adopt, for example, a configuration in which a personal computer or the like functions as the data processing apparatus of the present invention and executes the binarization process employing the dot arrangement patterns (index patterns) described in each of the embodiments.

Further, the present invention is put into practice by executing program codes of software such as those shown in FIG. 8, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-108908, filed Apr. 11, 2006, which is hereby incorporated by reference herein in its entirety.

What is claimed is:

1. A data processing apparatus comprising a processor that uses a pattern table arranging binarizing patterns correspondingly to positions of a pixel, each of which is used for a binarization process in which an arrangement of a number of dots depending on a value of multi-valued image data corresponding to the pixel is determined, to select the binarizing pattern depending on the position of the pixel and on the value of multi-valued image data corresponding to the pixel for executing the binarization process, wherein the pattern table corresponding to one of the values to be taken by the multi-valued image data includes a plurality of types of binarizing patterns which determine different arrangements of dots from each other, and the arrangement of each of the plurality of types of binarizing patterns in the pattern table corresponding to the one value has a characteristic that the arrangement is aperiodic and that low frequency components are fewer than high frequency components, wherein the characteristic that the low frequency components are fewer than the high frequency components means a characteristic that an integration value of low frequency components that exist in a lower side range than a middle of a spatial frequency range in which frequency components exist is smaller than an integration value of high frequency components that exist in a higher side range than the middle of a spatial frequency range.

2. A data processing apparatus as claimed in claim 1, further comprising a memory storing the pattern table, and wherein the binarization process is executed by referring to the pattern table stored in the memory.

3. A data processing method comprising the steps of:

using a pattern table arranging binarizing patterns correspondingly to positions of a pixel, each of which is used for a binarization process in which an arrangement of a number of dots depending on a value of multi-valued image data corresponding to the pixel is determined; and selecting the binarizing pattern depending on the position of the pixel and on the value of multi-valued image data corresponding to the pixel for executing the binarization process, wherein the pattern table corresponding to one of the values to be taken by the multi-valued image data includes a plurality of types of binarizing patterns which determine different arrangements of dots from each other, and the arrangement of each of the plurality of types of binarizing patterns in the pattern table corresponding to the one value has a characteristic that the arrangement is aperiodic and that low frequency components are fewer than high frequency components, and wherein the characteristic that the low frequency components are fewer than the high frequency components means a characteristic that an integration value of low frequency components that exist in a lower side range than a middle of a spatial frequency range in which frequency components exist is smaller than an integration value of high frequency components that exist in a higher side range than the middle of a spatial frequency range.

4. A non-transitory computer readable medium containing a program that is read by an information processing apparatus to make the information processing apparatus function as a data processing apparatus that uses a pattern table arranging binarizing patterns correspondingly to positions of a pixel, each of which is used for a binarization process in which an arrangement of a number of dots depending on a value of multi-valued image data corresponding to the pixel is determined, to select the binarizing pattern depending on the position of the pixel and on the value of multi-valued image data corresponding to the pixel for executing the binarization process, wherein the pattern table corresponding to one of the values to be taken by the multi-valued image data includes a plurality of types of binarizing patterns which determine different arrangements of dots from each other, and the arrangement of each of the plurality of types of binarizing patterns in the pattern table corresponding to the one value has a characteristic that the arrangement is aperiodic and that low frequency components are fewer than high frequency components, and wherein the characteristic that the low frequency components are fewer than the high frequency components means a characteristic that an integration value of low frequency components that exist in a lower side range than a middle of a spatial frequency range in which frequency components exist is smaller than an integration value of high frequency components that exist in a higher side range than the middle of a spatial frequency range.

\* \* \* \* \*